United States Patent [19]

Theuwissen et al.

[11] Patent Number: 4,668,991

[45] Date of Patent: May 26, 1987

[54] AUTOFOCUS TELEVISION CAMERA WITH MEANS FOR READING AND COMPARING PARTIAL IMAGES TO DERIVE A FOCUS INDICATION

[75] Inventors: Albert J. P. Theuwissen, Eindhoven, Netherlands; Munehisa Izushi, Osaka, Japan; Cornelis A. M. Jaspers, Eindhoven, Netherlands; Martinus J. H. van de Steeg, Eindhoven, Netherlands; Arend J. W. A. Vermeulen, Eindhoven, Netherlands

[73] Assignee: U.S. Philips Corporation, New York, N.Y.

[21] Appl. No.: 770,929

[22] Filed: Aug. 30, 1985

[30] Foreign Application Priority Data

Sep. 14, 1984 [NL] Netherlands .......................... 8402827
Jun. 6, 1985 [NL] Netherlands .......................... 8501634

[51] Int. Cl.[4] ............................................. H04N 5/232
[52] U.S. Cl. ...................................... 358/227; 358/225
[58] Field of Search ............................... 358/227, 225; 354/402–409

[56] References Cited

U.S. PATENT DOCUMENTS 3,824,337 7/1974 Sangster et al. ...................... 178/7.1
4,381,523 4/1983 Eguchi et al. ........................ 358/227
4,542,971 9/1985 Numata ............................... 354/403

*Primary Examiner*—Gene Z. Rubinson
*Assistant Examiner*—Stephen Brinich
*Attorney, Agent, or Firm*—Marc D. Schechter

[57] ABSTRACT

A camera for recording television, photographic or cinematographic images comprises an automatic focusing device. The information required for automatic focusing is obtained with the aid of a partial blocking arrangement for blocking two different portions of an optical path leading to an electronic image sensor. These two portions are located on opposite sides of an optical central axis. After signals obtained during the partial blocking periods have been compared with each other, the focusing is adjusted until signal correlation is optimized.

To produce a camera having both undisturbed scene recording and automatic focusing, while using only one sensor, this camera includes a charge transfer device. The device comprises a pickup member, a storage member, and a shift register member. The charge transfer device operates during a television field period TV in the following sequence: scene pickup period TVS, pickup storage transfer period TFO, first partial blocking pickup period TAS, first blocking storage transfer period TF1, second partial blocking pickup period TBS, and second blocking storage transfer period TF2.

9 Claims, 3 Drawing Figures

Figure 3:
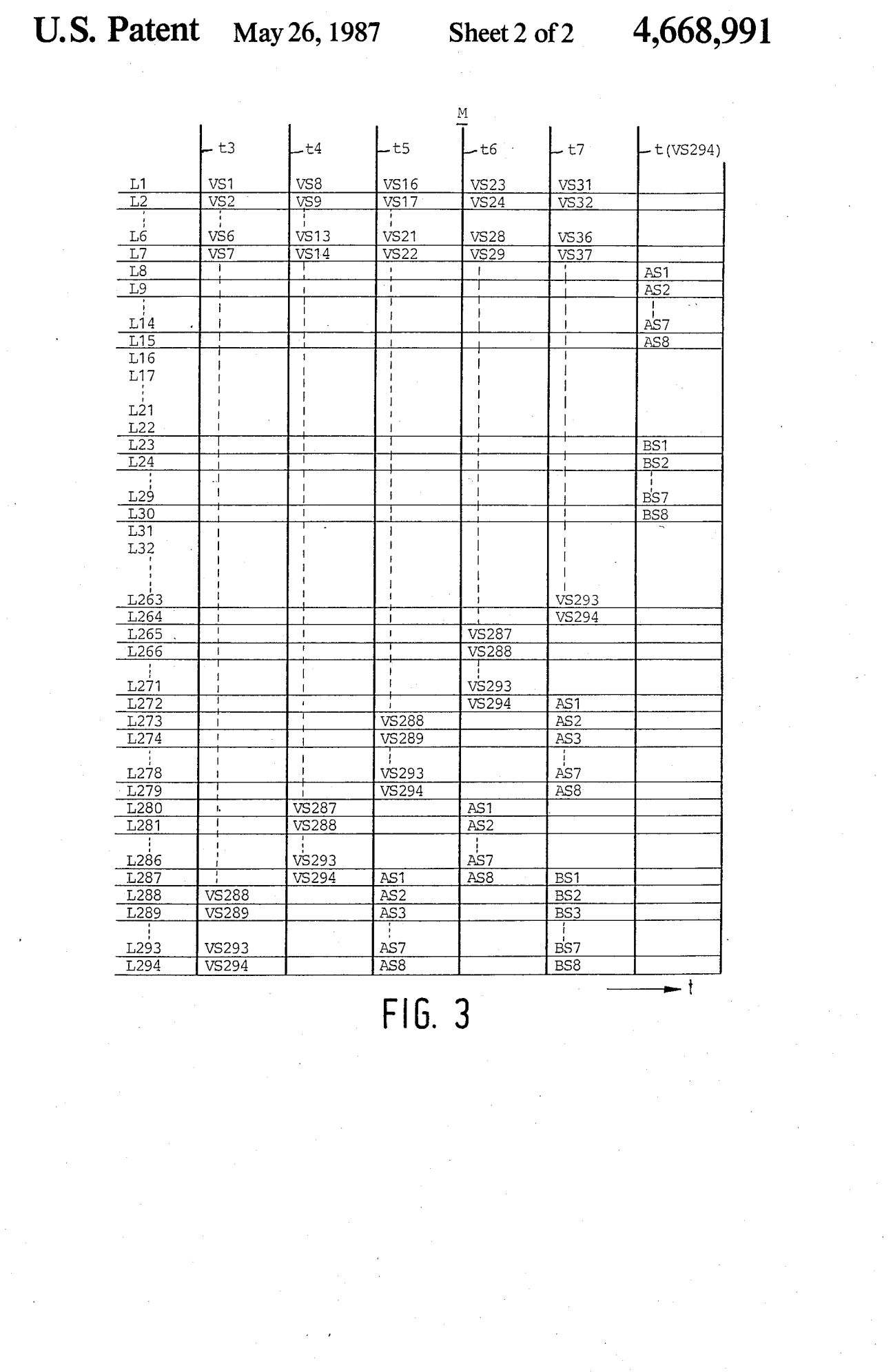

M (at t6)

| | t3 | t4 | t5 | t6 | t7 | t(VS294) |
|---|---|---|---|---|---|---|
| L1 | VS1 | VS8 | VS16 | VS23 | VS31 | |
| L2 | VS2 | VS9 | VS17 | VS24 | VS32 | |
| ⋮ | ⋮ | ⋮ | ⋮ | | | |
| L6 | VS6 | VS13 | VS21 | VS28 | VS36 | |
| L7 | VS7 | VS14 | VS22 | VS29 | VS37 | |
| L8 | | | | | | AS1 |
| L9 | | | | | | AS2 |
| ⋮ | | | | | | ⋮ |
| L14 | | | | | | AS7 |
| L15 | | | | | | AS8 |
| L16 | | | | | | |
| L17 | | | | | | |
| ⋮ | | | | | | |
| L21 | | | | | | |
| L22 | | | | | | |
| L23 | | | | | | BS1 |
| L24 | | | | | | BS2 |
| ⋮ | | | | | | ⋮ |
| L29 | | | | | | BS7 |
| L30 | | | | | | BS8 |
| L31 | | | | | | |
| L32 | | | | | | |
| ⋮ | | | | | | |
| L263 | | | | | VS293 | |
| L264 | | | | | VS294 | |
| L265 | | | | VS287 | | |
| L266 | | | | VS288 | | |
| ⋮ | | | | ⋮ | | |
| L271 | | | | VS293 | | |
| L272 | | | | VS294 | AS1 | |
| L273 | | | VS288 | | AS2 | |
| L274 | | | VS289 | | AS3 | |
| ⋮ | | | ⋮ | | ⋮ | |
| L278 | | | VS293 | | AS7 | |
| L279 | | | VS294 | | AS8 | |
| L280 | | VS287 | | AS1 | | |
| L281 | | VS288 | | AS2 | | |
| ⋮ | | ⋮ | | ⋮ | | |
| L286 | | VS293 | | AS7 | | |
| L287 | | VS294 | AS1 | AS8 | BS1 | |
| L288 | VS288 | | AS2 | | BS2 | |
| L289 | VS289 | | AS3 | | BS3 | |
| ⋮ | | | ⋮ | | ⋮ | |
| L293 | VS293 | | AS7 | | BS7 | |
| L294 | VS294 | | AS8 | | BS8 | |

AUTOFOCUS TELEVISION CAMERA WITH MEANS FOR READING AND COMPARING PARTIAL IMAGES TO DERIVE A FOCUS INDICATION

BACKGROUND OF THE INVENTION

The invention relates to an autofocus camera for recording television, photographic or cinematographic images. In the camera, an image of a scene to be recorded is formed on an electronic image sensor via an optical lens system. An aperture device is provided in the lens system for partly blocking the optical path in the lens system. This partial blocking action is produced at first and second portions of the optical path. The two portions are situated at substantially opposite positions on either side of a central axis of the optical path.

The camera comprises a signal comparison circuit for comparing the signals supplied by the sensor generated in first and second partial blocking periods during blocking of the first and second optical path portions, respectively. The focusing device provides substantially optimum focusing depending on the result of the comparison.

Such a camera is disclosed in U.S. Pat. No. 4,381,523. By partially blocking the optical path, two images are obtained via different portions of the optical lens system. When focusing is optimum, the two images are optimally in registration. A nonoptimum focusing results in images which are shifted relative to each other, the direction of the shift depending on whether there is overfocusing or underfocusing. During the signal comparison operation, the fact that the two images are shifted relative to each other is shown by a nonoptimum signal correlation. To obtain an optimum signal correlation, the focusing position is adjusted in the correct direction.

The described camera comprises a separate sensor for effecting the automatic focusing operation, or a single sensor having a specially dedicated portion therefor.

SUMMARY OF THE INVENTION

It is an object of the invention to provide a camera which does not have a separate sensor or separate sensor portion for automatic focusing, but in which the normal pickup device is also used for automatic focusing without disturbing the recording of the scene.

According to the invention, the electronic image sensor is a charge transfer device which is suitable for television. The charge transfer device comprises a pickup member, an information storage member, and a parallel-in, series-out shift register member connected to the sensor output terminal. During a television field period, the camera operates in a cycle with a scene pickup period, a scene information-transfer period for the transfer of information between the pickup member and the storage member, at least one pickup period equal to the first or second partial blocking period, respectively and at least one blocking information-transfer period for the transfer of information between the pickup member and the storge member.

In a further aspect of the camera according to the invention, the cycle contains a scene pickup period, a scene information-transfer period for the transfer of information between the pickup member and the storage member, a first partial blocking period, a first blocking information-transfer period for the transfer of information between the pickup member and the storage member, a second partial blocking period, and a second blocking information-transfer period for the transfer of information between the pickup member and the storage member.

The invention is based on the recognition that by using the above-described cycle in a charge transfer device, both normal recording of the scene and automatic focusing can be obtained.

During the blocking information-transfer period, the information is added up in a simple way in brief first and second pickup periods. The camera comprises a time signal generator for supplying different clock pulses for the transfer of information in and between the members of the sensor. The pickup member and the storage member are coupled to different clock pulse outputs during the blocking information-transfer periods. The clock pulse frequency for the transfer of information in the pickup member is a factor of some dozens higher than the clock pulse frequency for the transfer in the storage member. The transfer of information between the pickup member and the storage member is performed under the control of the clock pulses for the information transfer in the storage member.

In another embodiment of the camera, strong partial blocking information is obtained by adding together the information components. The product of the frequency factor and the durations of the first and second pickup periods, respectively, is on the order of magnitude of the scene pickup period. In this situation, the intensity of the partial blocking information is approximately half the intensity of the scene information if half of the optical path its blocked.

In an embodiment in which the focusing signals do not influence the scene signals, output of the sensor is coupled to an input of a switch having first and second outputs. The first output is coupled to a signal terminal of the camera and the second output is coupled to an input of the signal comparison circuit in the camera. The first and second outputs, respectively, are connected in the switch to the input during television field scanning periods and during field blanking periods, respectively.

BRIEF DESCRIPTION OF THE DRAWING

FIG. 3 schematically shows the movement of information, as a function of the time, through the storage member of a charge transfer device in the camera according to the invention.

DESCRIPTION OF THE PREFERRED EMBODIMENTS

Figure 1:
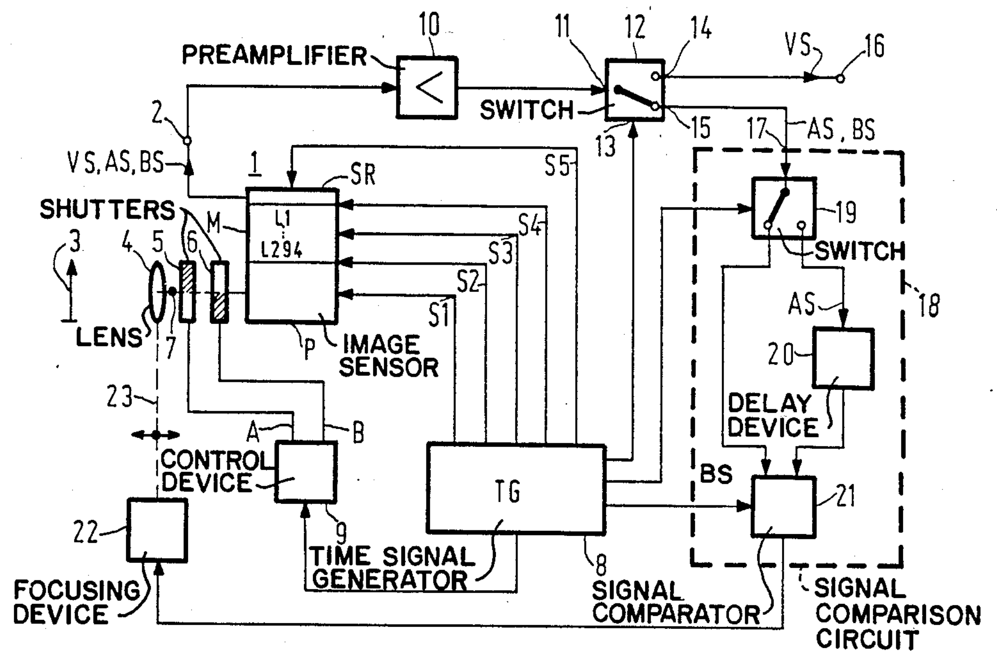
FIG. 1 schematically shows an embodiment of a camera according to the invention.

In a camera according to the invention, which is shown schematically in FIG. 1, an electronic image sensor 1 is a charge transfer device. More specifically sensor 1 is a frame transfer device (FTD).

The sensor 1 is an integrated circuit comprising a pickup member P and an adjacent information storage member M which is shielded from light. Adjacent to storage member M is a parallel-in series-out shift register member SR, which is also shielded from light. The construction of sensor 1 and its operation (under the control of clock pulse signals) is described in detail in U.S. Pat. No. 3,824,337, which is incorporated herein by reference.

The pickup member P and the storage member M are constructed from pickup and storage elements, respectively, which are arranged in rows and columns. Charge is transferred periodically along the columns in the members P and M and between them.

In FIG. 1, L1 . . . L294 in the storage member M denote each of the 294 rows of storage elements, which corresponds to 294 television lines. The pickup member P also has 294 rows of pickup elements. Instead of providing the row L1 of storage elements in the storage member M, the shift register member SR may alternatively be used for that purpose as described in U.S. Pat. No. 3,824,337. The shift register member SR may comprise a plurality of shift registers in combination with color stripe filters in front of the pickup member P.

Instead of having the described construction, sensor 1 may have a storage member M arranged in the integrated circuit under the pickup member P. In this situation, it should be ensured that light incident on the pickup member P does not reach the storage member M and the shift register member SR.

The charge from the pickup member P to the storage member M can now be transferred directly from each pickup element to the subjacent storage element. Then the charge can be transferred along each column in the storge member M to the shift register member SR. It should be noted that no charge is transferred between the pickup elements along the columns.

In another example of the sensor 1, the shift register SR is in the form of the base of a comb. The comb is shielded from light and the comb's teeth constitute the storage member M. The pickup elements of the pickup member P are arranged in columns between the teeth of the storage member M. In this example, the charge is transferred directly from each pickup element to the adjacent, associated storage elements. A sensor having such a construction is sometimes designated as an interline transfer device.

For simplicity in describing the camera shown in FIG. 1, the description will be based on the construction of the sensor 1 in the form of the frame transfer device shown. To control the sensor 1, it receives clock pulse signals denoted by S1, S2, S3, S4, S5. The clock pulse signals produce output signals VS, AS, and BS at an output terminal 2 of the sensor 1. Output terminal 2 is coupled to the output of the shift register member SR.

For the sake of simplicity, supply voltages for the sensor 1 and for other components in the camera of FIG. 1 are not shown.

The signal VS is associated with scene information to be displayed. The signals AS and BS are associated with respective first and second partially blocking information components.

The scene information to be displayed, contained in the signal VS originates from a scene which is shown as an arrow 3. Light coming from the scene 3 is projected onto the pickup member P of the sensor 1 via a lens system 4, which for the sake of simplicity is shown as a single lens, and an optical aperture device (5 and 6).

In FIG. 1 the aperture device is shown as having two shutters 5 and 6. The shutters 5 and 6 may be rotating disc shutters or electronically controlled shutters. The latter may comprise, for example, liquid crystals. Depending on the voltage to be applied across the crystal, the crystal transmits or blocks light.

In FIG. 1, the hatched parts of the shutters 5 and 6 schematically show that they can each partly block incident light. A portion of the optical path is then blocked.

Reference numeral 7 denotes the central axis of the optical path. The drawing shows that the shutters 5 and 6 block optical path portions which are situated more or less opposite each other on either side of the central axis 7 of the optical path. These optical path portions may be either an upper and a lower path portion or a left hand and a right hand path portion.

In the event that approximately half the diameter of the optical path is blocked, the strongest possible partial blocking information is obtained. The aperture device (5 and 6) may also be capable of completely blocking the incident light. This may have advantages, but it is not necessary.

When a scene is recorded, the light originating from the scene 3 forms an image on the pickup member P of the sensor 1. During a scene recording period, the photons of the incident light produce an electric charge integration in each of the pickup elements of the pickup member P. The pickup period is identical to a light integration period.

To process the scene information obtained by integration or accumulation in the pickup member P, the clock pulse signals S1 to S5 are supplied by a time signal generator (TG) 8. For a detailed construction of the different clock pulse signals reference is made to U.S. Pat. No. 3,824,337.

To emphasize the difference between control of the sensor 1 according to one aspect of the present invention, compared with the control described in U.S. Pat. No. 3,824,337, the clock pulse signals for controlling the charge transfer in the members P, M and SR (signals S1, S3 and S5) and between the members P and M, M and SR (signals S2 and S4) are shown separately.

In addition to the clock pulse signals S1 to S5, the time signal generator 8 supplies other control signals to other components of the camera shown in FIG. 1. Thus, the generator 8 applies a control signal to a control device 9 via which the aperture device (5 and 6) is operated in synchronism with the sensor 1. In this situation it is assumed, for example, that the optical blocking arrangement (5, 6 and 9) is operated by essentially partial blocking and, optionally, total blocking.

Figure 2:
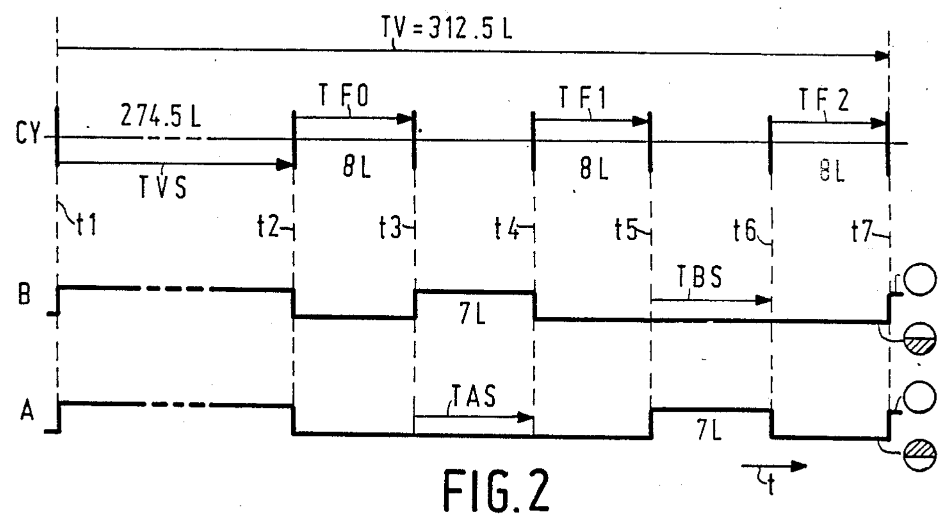
FIG. 2 shows signals applied to optical shutters according the invention as a function of the time.

FIG. 1 shows that the control device 9 applies a signal A or B to the respective shutters 5 and 6. FIG. 2 shows associated signal diagrams A and B as a function of the time t.

The sensor output terminal 2 carrying the signal sequence VS, AS, BS is connected to an input 11 of a switch 12 via, for example, a preamplifier 10. Further amplifiers arranged in the camera and further signal processing circuits are not shown for the sake of simplicity.

The generator 8 applies a control signal to a control input 13 of the switch 12. In response to the control signal, a first output 14 of switch 12 supplies the signal VS. A second output 15 of switch 12 supplies the signal sequence AS, BS.

The signal VS which represents the scene information to be displayed is supplied from an output terminal 16 of the camera shown in FIG. 1. In the case in which the signal VS is further processed in a manner customary for television, the camera shown in FIG. 1 operates as a television camera.

Another possibility is to process the signal VS into a signal suitable for motion picture film reproduction, so that the camera shown in FIG. 1 forms part of a motion picture film camera as a pickup member. A further possibility is to process the signal VS to form a photograph or a slide, so that the camera of FIG. 1 forms part of a still-photographic camera, as its pickup member. Independent of the specific camera construction, the camera shown in FIG. 1 may be used for monochrome or color television. When operating as a color television camera, a plurality of sensors 1 may be used.

The output 15 of the switch 12 with the signal sequence AS, BS is coupled to an input 17 of a signal comparison circuit 18. The circuit 18 comprises a switch 19 having two outputs which are coupled directly or via a delay device 20 to inputs of a signal comparator 21.

The generator 8 applies a control signal to the switch 19, in response to which the signal AS from the signal sequence AS, BS is sent to the delay device 20 and the signal BS to the signal comparator 21. The originally sequential signals AS and BS are compared to each other, now as simultaneous signals, in the signal comparator 21. The result of this comparison, which depends on the extent to which there is signal correlation, is sent by the comparator 21, under the control of the generator 8, to a focusing device 22, which is coupled via coupling 23 to the lens system 4.

Depending on the result of the comparison, the device 22 changes the focusing of the lens system 4 until any over or underfocusing, respectively, is minimized. The control is shown schematically in FIG. 1 by two oppositely directed arrows at the coupling 23 between the lens system 4 and the focusing device 22.

The camera shown in FIG. 1 operates known manner with the signal comparison circuit 18 and the focusing device 22, which together constitute an automatic focusing device (18 and 22) for the lens system 4. According to the invention, for a given mode of operation of the shutter arrangement (5, 6, 9) and when the described charge transfer device is used for the sensor 1, a camera is obtained in which, without influencing each other, both normal scene recording and automatic focusing are obtained.

FIG. 2 illstrates a cycle CY for the operation of the camera shown in FIG. 1, and the signals A and B for the shutters 5 and 6 of the arrangement (5, 6, 9). At the signals A and B of FIG. 2, the states of the optical path are illustrated by circles. Plain circles are associated with an unblocked optical path, and half hatched circles are associated with a partially blocked optical path. It will be apparent that when both shutters 5 and 6 simultaneously partially block the image (that is, both signals A and B are "low") total blocking is produced.

In the signal A, TAS denotes a period of time during which only the shutter 5 is partially blocking. TBS in the signal B denotes a period of time during which only the shutter 6 is partially blocking. The first partial blocking period TAS and the subsequent, second partial blocking period TBS are then equal to first and second recording periods, respectively at the sensor 1.

TV in the cycle CY of FIG. 2 denotes a television field period. The legend TV=312.5 L, means that there are 312.5 television lines in the field period. If the camera shown in FIG. 1 operates according to a single interlaced 625-line standard, then TV=20 ms for a field frequency of 50 Hz. For the 525-line standard, TV=262.5 L and TV=16.683 ms for a field frequency of 59.94 Hz. For each television line, L, the line period is equal to 64 or 63.556 μs, respectively, and the line frequency is equal to 15625 or 15,734 Hz, respectively. Instead of the interlaced television standards described, a different, noninterlaced television system may alternatively be used to equal advantage.

In the drawing the cycle CY is shown with six specific, contiguous periods. These periods need not be contiguous.

The first period in the cycle CY is designated by TVS, a scene pickup period. During the scene pickup period TVS, the sensor 1 integrates the light incident on the pickup member P and originating from the scene 3 to be televised to form an accumulated charge. From the signals A and B it will be apparent that the optical path 7 is not blocked. The beginning and end, respectively, of the light integration is denoted by the instants t1 and t2.

The scene pickup period TVS is followed by a scene information-transfer period TF0. During period TF0, information is transferred from the pickup member P to the storage member M of the sensor 1 of FIG. 1. The information is transferred in known manner under the control of clock pulse signals S1, S2 and S3, which are then identical.

The scene information-transfer period TF0 has a duration of, for example, eight line periods and ends at instant t3. During period TF0, signals A and B are set so that the optical path 7 is totally blocked. This blocking action prevents what is commonly known as a smear signal from being generated by the pickup member P, which would indeed be produced if the light integration in the pickup member P continued during the transfer period TF0 of 8 L.

If smear signal generation is acceptable and is compensated, for example, by subsequent electronic signal processing, this total optical blocking may be omitted.

At instant t3 of the cycle CY of FIG. 2, the storage member M has received all the scene information from the pickup member P of the sensor 1 of FIG. 1. FIG. 3 then shows the movement of information through the storage member M from the instant t3.

In FIG. 3, L1, L2 through L294 denote the storage rows, L, which correspond to television lines, L, bearing the same numbers. The stored scene information is denoted by VS1, VS2, etc. through VS 294. The instant t3 is assumed to be the instant at which the first television line containing the scene information VS1 is transferred from the storage member M to the parallel-in series-out shift register member SR.

This information is transferred in known manner during a line blanking interval (12 μs) of the line period. The scene information components VS2 through VS 294 move to the storage rows L1 through L293, respectively. Thereafter, the storage row L294 no longer contains any information.

Information is transferred from the storage member M to the register member SR under the control of the clock pulse signal S3 and S4. During the line period, the line scanning period (52 μs) follows the line blanking interval. During the line scanning period, the shift register SR supplies the recorded scene information VS1 from the output terminal 2. Register SR is controlled by clock pulse signal S5.

The same occurs during subsequent line periods, so that the scene information VS2 is output at terminal 2, while the scene information components VS3 to VS294 are shifted to the storage rows L1 to L292. Storage rows L294 and L293 no longer contain information. Information is transferred between the storage rows at the line frequency, which in the example given in FIG. 2 is equal to 15,625 Hz.

While from the instant t3 the scene information components VS1 through VS294 of FIG. 3 are transferred from the storage M to the shift register member SR of FIG. 1, it follows from FIG. 2 that in the subsequent period TAS=7 L the optical path 7 is only half blocked by the shutter 5 shown in FIG. 1. From the instant t3 the path is half blocked until instant t4. In this situation, light integration produces the first blocking information in the pickup member P of the sensor 1. After the pickup period TAS, there is, in accordance with the cycle CY, a blocking information-transfer period TF1=8 L, until instant t5.

As shown in FIG. 3, the scene information components VS8 through VS294 are present in the storage member M at the instant t4, and the storage rows L288 through L294 no longer contain any information. According to one aspect of the invention, during the blocking information-transfer period TF1 the clock pulse frequency of the signal S1 (which shifts information through pickup member P) is a factor of some dozens higher than the clock pulse frequency of the signal S2 (which controls the transfer of information from the pickup member P to the storage member M). As a result, at the first row of pickup elements in the pickup member P the information components are added together, until the number of shifts in pickup member P equals are shift between the pickup member P and the storage member M.

The frequency factor may be, for example, equal to forty. This causes the information from forty rows of pickup elements to be added into one row of storage elements. Therefore, with a 15,625 Hz line frequency for the transfer of information in the storage member M, the transfer frequency in the pickup member P is 625 kHz. The blocking information originating from the 294 pickup rows is condensed into eight memory rows (7 memory rows corresponding to 40 pickup rows, and one memory row corresponding to 14 pickup rows).

The blocking information components are denoted by AS1, AS2 to AS8. The blocking information components AS1 to AS7 are each formed from forty pickup rows, and the blocking information AS8 is formed from fourteen pickup rows. FIG. 3 shows that between the last scene information VS294 and the first blocking information AS1 there are seven memory rows without information.

Choosing the frequency factor to be equal to 40 results in, for a light integration period TAS equal to 7 line periods and a partial blocking of half of the optical path 7, the intensity of the partial blocking information corresponding to a factor of $\frac{1}{2}\times 7\ L\times 40=140\ L$. This is compared to the intensity factor of 274.5 L for the scene information. In other words, by choosing the product (280 L) of the frequency factor (40) and the duration of the partial blocking periods (TAS=7 L) to be on the order of magnitude of the scene pickup period (TVS=274.5 L), adequate partial blocking information is obtained with not more than approximately half the scene information.

As shown in FIG. 2, at the instant t5 the second partial blocking information pickup starts. The shutter 6 of FIG. 1 partially blocks the optical path 7 during the pickup period TBS, as shown by the signal diagram B.

In the manner described for the period TAS, light integration occurs during the period TBS=7 L at the pickup member P of the sensor 1 until instant t6. At t6, a blocking information-transfer period TF2=8 L follows until instant t7.

FIG. 3 shows that at the instant t6, the seven storage rows L288 to L294 do not contain information. At the instant t7, the storage rows L287 to L294 are filled with second blocking information components BS1 through BS8. From the cycle CY of FIG. 2 it will be evident that the final instant t7 of one cycle is the starting instant t1 of the next cycle.

FIG. 2 shows that during the field period TV the pickup member P transfers information three times to the storage member M (during transfer periods TF0, TF1 and TF2). Then, there are two short blocking information pickup periods TAS and TBS. For TF0=TF1=TF2=8 L, and TAS=TBS=7 L, it follows that for the scene information pickup period TVS 274.5 line periods remain in each field period. Compared with the prior art cameras for which TV=TVS+TF0, it follows that for TF0=8 L 304.5 line periods remain for a scene-pickup period TVS. As a result, the scene information signal according to the invention is only 90% of the scene information signal in prior cameras. The attenuation of 10% is, however, permissible.

If signal smear is permitted, the optical path 7 need not be completely blocked during both periods TF1 and TF2. It is then assumed that the two signal smears are in correlation.

From the instant t3, the scene information VS is transferred from the storage member M to the shift register member SR during substantially 294 line periods. In FIG. 3, t(VS294) indicates the instant at which scene information VS is completely read out of the storage member M. The blocking information components AS and BS are then present in the storage rows L8 to L15 and L23 to L30, respectively. The remaining storage rows do not contain information.

The instant t(VS294) occurs 294+8=302 line periods after the instant t2 at which the storage member M was filled during the period TF0=8 L with the scene information VS. Therefore, a period of 10.5 line periods is available for transferring the blocking information components AS and BS from the storage member M. This period of 10.5 line periods is well within the standard field blanking period of 8% of the field period, which in the present example is 25 line periods.

Sensor 1 applies scene information VS to the terminal 16 during 294 line periods, which causes the field scanning period of 287.5 line periods to be exceeded by 6.5 line periods, which is customary. In accordance with the television standard, the field scanning period starts at the instant t3, which is preceded by the field blanking period of 25 line periods.

As mentioned above 10.5 line periods (0.672 ms) are available, in the field blanking period, for processing the blocking information components AS and BS which are present in part of the thirty storage rows L1 through L30. For this processing operation it is assumed that the shift register member SR is supplying information in the normal manner in the 52 $\mu$s line scanning period. The signals may be transferred to the shift register member SR from the storage member M in the 12 $\mu$s line blanking period, at the rate of one signal in each 1.6 $\mu$s period when the clock pulse signal has a frequency of 625 kHz. With a sequential transfer from storage rows L, and adding in the shift register member SR, the transfer has a duration of an integral multiple of 1.6 μs. For the sequential transmission from (not more than) 7 storage rows L, a 11.2 μs period is required, which is within the 12 μs line blanking period.

Starting with the above values, the blocking information can be transferred within line periods of 64 μs after the instant t(VS294) of FIG. 3. Then, from the available 672 μs, 576 μs is used and 1.5 line periods remains. Within the 12 μs line blanking periods, between 1 and not more than 7 sequential rows of information can be transferred with the aid of the clock pulses (S3 and S4) with the 1.6 μs period.

To illustrate an example of the blocking information-transfer, the following Table is provided.

TABLE

| Line period number | Number of transfers | From storage row(s) | Blocking information at output terminal. |
|---|---|---|---|
| 1 | 7 | L1–L7 | none |
| 2 | 3 | L8,L9,L10 | AS1 + AS2 + AS3 |
| 3 | 1 | L11 | AS4 |
| 4 | 3 | L12,L13,L14 | AS5 + AS6 + AS7 |
| 5 | 7 | L15–L21 | AS8 |
| 6 | 4 | L22–L25 | BS1 + BS2 + BS3 |
| 7 | 1 | L26 | BS4 |
| 8 | 3 | L27,L28,L29 | BS5 + BS6 + BS7 |
| 9 | 1 | L30 | BS8 |

In the line blanking period of the line period number 6, the switch 19 of FIG. 1 is moved to the position shown in the drawing. During the line periods 2, 3, 4 and 5 switch 19 is connected to delay device 20. The blocking information components AS, delayed by four line periods via the delay device 20, are input to comparator 21 simultaneously with the blocking information components BS which are comparable therewith.

During the comparison of the blocking signals to determine the extent to which there is signal correlation, weighting factors may be used, as the intensities of the blocking information components during the line periods 2, 4, 6 and 8; 3 and 7; 5 and 9 are in a ratio of 120:40:14. With the aid of these weighting factors the position in the scene image to be focussed can be determined, as the blocking information components in the line periods 2, 3, 4 and 5 to 6, 7, 8 and 9, respectively originate from portions of the pickup member P which are increasingly remote from the storage member M.

Instead of the described partial blocking information processing operation in the numbered line periods and an adding operation in the shift register member SR, information processing could be accelerated by using a higher clock pulse frequency.

The above, detailed description of the construction of the sensor 1 as a frame transfer device operating with information transfer along columns of pickup elements in the pickup member P, renders it possible, because of the free choice of the clock pulse frequency factor (for example equal to 40) to add the information components together in the first row of pickup elements. In the case described, with the subjacent storage member M, without a transfer feature in the column direction of the pickup elements in the superjacent pickup member P this adding feature is not present.

Two subsequent partial blocking information generating operations may then be considered, each 15 line periods long, after the instant t3 of FIG. 2. At the end of both 15 line periods the information from, for example, the last 8 pickup element rows is simultaneously transferred to the subjacent, associated storage rows. Then, the remaining pickup element rows are reset to the starting point of the integration. Instead of the blocking information intensity factor of $\frac{1}{2}\times 7\ L\times 40=140\ L$ calculated for the frame transfer device, a factor of $\frac{1}{2}\times 15\ L=7.5\ L$ is now obtained. This also applies to the described interline transfer device.

If the camera shown in FIG. 1 comprises a plurality of sensors, as used in color television, it is sufficient to use one of the sensors for generating the partial blocking information.

FIG. 2 shows one cycle of the field period TV in which the scene information and the two blocking information components are processed by the sensor 1 of FIG. 1. Instead of this mode, the image and focusing information might be produced with one cycle per field period TV in which the scene information is processed and one cycle for processing the blocking information. Thus, during a field period TV there is a cycle with a scene pickup period, a scene information-transfer period for the transfer of information between the pickup member and the storage member, at least one pickup period equal to the first or second partial-blocking period, respectively, and at least one blocking information-transfer period for the transfer of information between the pickup member and the storage member.

Over two field periods TV, the first and second blocking information are processed separately in each field period. This results on the one hand in a larger time difference equal to one field period TV between instants at which the first and second blocking information are obtained, and on the other hand in a scene pickup period TVS of a longer duration than shown in FIG. 2. Using the same numerical values for the periods TF1=TF2=8 L and TAS=TBS=7 L, the longer period TVS=289.5 L is obtained. For the known pickup period TVS=304.5 this results for the generation of scene information having an intensity equal to 0.95 of that of prior cameras (i.e. an attenuation of 5%).

What is claimed is:

1. An automatic focusing camera comprising:

an electronic image sensor supplying an output signal;

an optical lens system for forming an image of a scene on the sensor, said lens system having an optical axis and an optical path;

an optical shutter device arranged between the lens system and the sensor, said shutter device being capable of separately blocking first and second portions of the optical path, said first and second optical path portions being arranged on opposite sides of the optical axis;

signal comparison means for comparing the output signal of the sensor when the first portion of the optical path is blocked with the output signal of the sensor when the second portion of the optical path is blocked, said comparison means producing a comparison output signal in response to the comparison; and means for adjusting the lens system to focus the image on the sensor in response to the output of the comparison means;

characterized in that:

the electronic image sensor is a charge transfer device with a pickup member, an information storage member, and a parallel-in, series-out shift register, said shift register supplying the sensor output; and the camera comprises means for operating the sensor in a cycle which repeats once each field period, said cycle comprising (i) generating over a time period TVS an image signal corresponding to the image of the scene in the pickup member, (ii) then transferring the image signal in the pickup member to the storage member, (iii) then generating over a time period TAS a partial image signal corresponding to blocking of the first or the second portion of the optical path of the lens system, and (iv) then transferring the partial image signal in the pickup member to the storage member.

2. A camera as claimed in claim 1, further characterized in that the cycle comprises (i) generating over a time period TVS an image signal corresponding to the image of the scene in the pickup member, (ii) then transferring the image signal in the pickup member to the storage member, (iii) then generating over a time period TAS a first partial image signal corresponding to blocking of the first portion of the optical path of the lens system, (iv) then transferring the first partial image signal in the pickup member to the storage member, (v) then generating over a time period TVS a second partial image signal corresponding to blocking of the second portion of the optical path of the lens system, and (iv) then transferring the second partial image signal in the pickup member to the storage member.

3. A camera as claimed in claim 2, further comprising a clock signal generator for generating first and second clock pulses during the transfer of a partial image signal from the pickup member to the storage member, the first clock pulses for moving signals through the pickup member toward the storage member, the second clock pulses for transferring signals from the pickup member to the storage member and for moving signals through the storage member, the first clock pulses having a frequency n times higher than the second clock pulses, where n is at least 12.

4. A camera as claimed in claim 3, further characterized in that the product of n times TAS or n times TBS is on the order of magnitude of TVS.

5. A camera as claimed in claim 4, further comprising a switch having one input switchable between first and second outputs, the switch input being connected to the sensor output, the first switch output being connected to a signal output of the camera, the second switch output being connected to the comparison means.

6. A camera as claimed in claim 1, further comprising a clock signal generator for generating first and second clock pulses during the transfer of a partial image signal from the pickup member to the storage member, the first clock pulses for moving signals through the pickup member toward the storage member, the second clock pulses for transferring signals from the pickup member to the storage member and for moving signals through the storage member, the first clock pulses having a frequency n times higher than the second clock pulses, where n is at least 12.

7. A camera as claimed in claim 6, further characterized in that the product of n times TAS or n times TBS is on the order of magnitude of TVS.

8. A camera as claimed in claim 7, further comprising a switch having one input switchable between first and second outputs, the switch input being connected to the sensor output, the first switch output being connected to a signal output of the camera, the second switch output being connected to the comparison means.

9. An automatic focusing camera comprising:

an electronic image sensor supplying an output signal;

an optical lens system for forming an image of a scene on the sensor, said optical lens system having an optical path;

means for generating a scene signal corresponding to the image with the entire optical path of the lens unblocked, said scene signal being generated once each field period;

means for generating a first focus signal while a first portion of the optical path is blocked;

means for generating a second focus signal while a second portion of the optical path is blocked;

means for comparing the first and second focus signals and for generating a comparison signal in response thereto; and means for adjusting the lens system to focus the image on the sensor in response to the comparison signal;

characterized in that the scene signal and at least one focus signal are sequentially generated once each field period.

* * * * *